(12) United States Patent
Dong et al.

(10) Patent No.: US 12,489,360 B2
(45) Date of Patent: Dec. 2, 2025

(54) MULTI-LEVEL AC/DC CONVERSION CIRCUIT, MULTI-LEVEL DC/DC CONVERSION CIRCUIT AND CONTROL METHODS THEREOF

(71) Applicant: Delta Electronics (Shanghai) Co., Ltd., Shanghai (CN)

(72) Inventors: Kai Dong, Shanghai (CN); Yichao Wang, Shanghai (CN); Yuhua Hu, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 173 days.

(21) Appl. No.: 18/372,582

(22) Filed: Sep. 25, 2023

(65) Prior Publication Data

US 2024/0162805 A1 May 16, 2024

(30) Foreign Application Priority Data

Nov. 9, 2022 (CN) .......................... 202211401076.6

(51) Int. Cl.
*H02M 7/219* (2006.01)
*H02M 1/00* (2006.01)
*H02M 3/07* (2006.01)
*H02M 3/158* (2006.01)
*H02M 7/483* (2007.01)

(52) U.S. Cl.
CPC ....... *H02M 1/0095* (2021.05); *H02M 1/0032* (2021.05); *H02M 3/158* (2013.01); *H02M 7/219* (2013.01); *H02M 7/4837* (2021.05); *H02M 3/07* (2013.01)

(58) Field of Classification Search
CPC .... H02M 1/0095; H02M 1/0032; H02M 3/07; H02M 3/158; H02M 7/219; H02M 7/4837

See application file for complete search history.

(56) References Cited

U.S. PATENT DOCUMENTS

| 9,608,532 | B2 | 3/2017 | Wong et al. | |
|---|---|---|---|---|
| 2014/0233279 | A1* | 8/2014 | Kondo | ................ H02M 5/4585 363/37 |
| 2017/0310105 | A1 | 10/2017 | Shen et al. | |

(Continued)

FOREIGN PATENT DOCUMENTS

| CN | 109687704 B | 8/2020 |
|---|---|---|
| CN | 112134443 B | 9/2021 |
| CN | 113541473 A | 10/2021 |

*Primary Examiner* — Jue Zhang
(74) *Attorney, Agent, or Firm* — KIRTON McCONKIE; Evan R. Witt

(57) ABSTRACT

In the present disclosure, the multi-level AC/DC conversion circuit and the multi-level DC/DC conversion circuit calculate the duty ratio of synchronous rectification switch according to the input voltage, the output voltage, the interval time of turning on the main switch, the switching cycle and the duty ratio of main switch, thereby eliminating the need for additional zero-current detecting function or zero-crossing detection circuit in conventional AC/DC conversion circuits. Accordingly, for the multi-level AC/DC conversion circuit and the multi-level DC/DC conversion circuit of the present disclosure, the cost is reduced, and the reliability is enhanced.

16 Claims, 11 Drawing Sheets

(56) References Cited

U.S. PATENT DOCUMENTS

| | | | |
|---|---|---|---|
| 2020/0220471 A1* | 7/2020 | Kikuchi | H02M 5/458 |
| 2021/0344277 A1* | 11/2021 | Toyoda | H02M 7/4837 |
| 2021/0376754 A1* | 12/2021 | Jang | H02M 7/219 |
| 2022/0190712 A1 | 6/2022 | Chen et al. | |
| 2022/0344946 A1 | 10/2022 | Wang et al. | |
| 2023/0412090 A1 | 12/2023 | Abdelhamid et al. | |
| 2024/0162834 A1 | 5/2024 | Wang et al. | |
| 2025/0079974 A1 | 3/2025 | Hu et al. | |

* cited by examiner

MULTI-LEVEL AC/DC CONVERSION CIRCUIT, MULTI-LEVEL DC/DC CONVERSION CIRCUIT AND CONTROL METHODS THEREOF

CROSS-REFERENCE TO RELATED APPLICATION

This application claims priority to China Patent Application No. 202211401076.6, filed on Nov. 9, 2022, the entire contents of which are incorporated herein by reference for all purposes.

FIELD OF THE INVENTION

The present disclosure relates to a multi-level conversion circuit and a control method thereof, and more particularly to a multi-level AC/DC conversion circuit, a multi-level DC/DC conversion circuit and control methods thereof.

BACKGROUND OF THE INVENTION

Electric energy conversion circuits, such as AC/DC conversion circuits or DC/DC conversion circuits, include flying capacitor multi-level circuits. In order to improve the efficiency of flying capacitor multi-level circuits, the rectifier diode in the circuit is replaced by the synchronous rectification switch. The turn-off time of the synchronous rectification switch needs to be accurately set because it directly affects the operation of the electric energy conversion circuit. If the rectification switch is turned off too early, greater losses in the electric energy conversion circuit may be generated. If the rectification switch is turned off too late, the negative current would flow through the flying capacitor, which makes the electric energy conversion circuit unable to work normally. Moreover, since the synchronous rectification switch in the electric energy conversion circuit needs to be clamped by the flying capacitor, the synchronous rectification switch may be broken when the current flowing through the flying capacitor is too large.

Conventionally, a zero-current detecting function or a zero-crossing detection circuit is added to the flying capacitor multi-level circuit, so as to accurately control the turn-off time of the synchronous rectification switch. Therefore, the real-time turn-off function of the synchronous rectification switch is ensured, and thus the circuit efficiency is improved. However, if the AC/DC conversion circuit is equipped with zero-current detecting function, the current ripple caused by the high-frequency switching would make the current direction vary over and over again under light load. Further, the sampling errors introduced by the sampling circuit and digital sampling would make the controller misjudge the polarity of the current, which may affect the zero-current detecting function. Alternatively, if the AC/DC conversion circuit is equipped with a zero-crossing detection circuit, the cost and layout difficulty are increased, and the negative current may be generated by some delay.

Therefore, there is a need of providing a multi-level AC/DC conversion circuit, a multi-level DC/DC conversion circuit and control methods thereof in order to overcome the drawbacks of the conventional technologies.

SUMMARY OF THE INVENTION

The present disclosure provides a multi-level AC/DC conversion circuit, a multi-level DC/DC conversion circuit and control methods thereof, which calculate the duty ratio of synchronous rectification switch according to the input voltage, the output voltage, the interval time of turning on the main switch, the switching cycle and the duty ratio of main switch. Accordingly, for the multi-level AC/DC conversion circuit and the multi-level DC/DC conversion circuit of the present disclosure, the cost is reduced, and the reliability is enhanced.

In accordance with an aspect of the present disclosure, a multi-level AC/DC conversion circuit is provided. The multi-level AC/DC conversion circuit includes a first input terminal, a second input terminal, a positive output terminal, a negative output terminal, a switch bridge arm, an inductor, an N-level conversion circuit, and a control module. The first input terminal and the second input terminal are configured to receive an input voltage. The positive output terminal and the negative output terminal are configured to provide an output voltage to a load. The switch bridge arm is connected between the positive output terminal and the negative output terminal, and includes a first switch and a second switch electrically connected in series to form a connection node connected to the first input terminal. The inductor has a first terminal and a second terminal, and the first terminal of the inductor is electrically connected to the second input terminal. N is a natural number greater than 2. The N-level conversion circuit includes N−1 upper switches, N−1 lower switches and N−2 flying capacitors. A first upper switch to an (N−1)th upper switch among the N−1 upper switches are electrically connected in series between the second terminal of the inductor and the positive output terminal sequentially and form a first upper connection node to an (N−2)th upper connection node sequentially. A first lower switch to an (N−1)th lower switch among the N−1 lower switches are electrically connected in series between the second terminal of the inductor and the negative output terminal sequentially and form a first lower connection node to an (N−2)th lower connection node sequentially. The first to (N−1)th lower switches are corresponding to the first to (N−1)th upper switches respectively, the first to (N−2)th upper connection nodes are corresponding to the first to (N−2)th lower connection nodes respectively, and the first to (N−2)th upper connection nodes and the first to (N−2)th lower connection nodes collectively form a first pair of connection nodes to an (N−2)th pair of connection nodes. The N−2 flying capacitors are respectively connected to the first pair of connection nodes to the (N−2)th pair of connection nodes sequentially. When the multi-level AC/DC conversion circuit operates in a discontinuous conduction mode, the control module is configured to: regard the N−1 lower switches and the N−1 upper switches as N−1 main switches and N−1 synchronous rectification switches respectively when a potential at the first input terminal is lower than a potential at the second input terminal, and regard the N−1 upper switches and the N−1 lower switches as the N−1 main switches and the N−1 synchronous rectification switches respectively when the potential at the first input terminal is higher than the potential at the second input terminal; control the N−1 main switches to operate with a switching cycle and to turn on alternately with an interval time; and calculate a duty ratio of the N−1 synchronous rectification switches according to at least the input voltage, the output voltage, the interval time, the switching cycle and a duty ratio of the N−1 main switches.

In accordance with another aspect of the present disclosure, a control method of a multi-level AC/DC conversion circuit is provided. The multi-level AC/DC conversion circuit includes a first input terminal, a second input terminal, a positive output terminal, a negative output terminal, a switch bridge arm, an inductor, and an N-level conversion circuit. The first input terminal and the second input terminal are configured to receive an input voltage. The positive output terminal and the negative output terminal are configured to provide an output voltage to a load. The switch bridge arm is connected between the positive output terminal and the negative output terminal, and includes a first switch and a second switch electrically connected in series to form a connection node connected to the first input terminal. The inductor has a first terminal and a second terminal, and the first terminal of the inductor is electrically connected to the second input terminal. N is a natural number greater than 2. The N-level conversion circuit includes N−1 upper switches, N−1 lower switches and N−2 flying capacitors. A first upper switch to an (N−1)th upper switch among the N−1 upper switches are electrically connected in series between the second terminal of the inductor and the positive output terminal sequentially and form a first upper connection node to an (N−2)th upper connection node sequentially. A first lower switch to an (N−1)th lower switch among the N−1 lower switches are electrically connected in series between the second terminal of the inductor and the negative output terminal sequentially and form a first lower connection node to an (N−2)th lower connection node sequentially. The first to (N−1)th lower switches are corresponding to the first to (N−1)th upper switches respectively, the first to (N−2)th upper connection nodes are corresponding to the first to (N−2)th lower connection nodes respectively, and the first to (N−2)th upper connection nodes and the first to (N−2)th lower connection nodes collectively form a first pair of connection nodes to an (N−2)th pair of connection nodes. The N−2 flying capacitors are respectively connected to the first pair of connection nodes to the (N−2)th pair of connection nodes sequentially. When the multi-level AC/DC conversion circuit operates in a discontinuous conduction mode, the control method includes: regarding the N−1 lower switches and the N−1 upper switches as N−1 main switches and N−1 synchronous rectification switches respectively when a potential at the first input terminal is lower than a potential at the second input terminal, and regarding the N−1 upper switches and the N−1 lower switches as the N−1 main switches and the N−1 synchronous rectification switches respectively when the potential at the first input terminal is higher than the potential at the second input terminal; controlling the N−1 main switches to operate with a switching cycle and to turn on alternately with an interval time; and calculating a duty ratio of the N−1 synchronous rectification switches according to at least the input voltage, the output voltage, the interval time, the switching cycle and a duty ratio of the N−1 main switches.

In accordance with another aspect of the present disclosure, a multi-level DC/DC conversion circuit is provided. The multi-level DC/DC conversion circuit includes a positive input terminal, a negative input terminal, a positive output terminal, a negative output terminal, an inductor, an N-level conversion circuit, and a control module. The positive input terminal and the negative input terminal are configured to receive an input voltage. The positive output terminal and the negative output terminal are configured to provide an output voltage to a load, and the negative output terminal is connected to the negative input terminal. The inductor has a first terminal and a second terminal, and the first terminal of the inductor is electrically connected to the positive input terminal. N is a natural number greater than 2. The N-level conversion circuit includes N−1 upper switches, N−1 lower switches and N−2 flying capacitors. A first upper switch to an (N−1)th upper switch among the N−1 upper switches are electrically connected in series between the second terminal of the inductor and the positive output terminal sequentially and form a first upper connection node to an (N−2)th upper connection node sequentially. A first lower switch to an (N−1)th lower switch among the N−1 lower switches are electrically connected in series between the second terminal of the inductor and the negative output terminal sequentially and form a first lower connection node to an (N−2)th lower connection node sequentially. The first to (N−1)th lower switches are corresponding to the first to (N−1)th upper switches respectively, the first to (N−2)th upper connection nodes are corresponding to the first to (N−2)th lower connection nodes respectively, and the first to (N−2)th upper connection nodes and the first to (N−2)th lower connection nodes collectively form a first pair of connection nodes to an (N−2)th pair of connection nodes. The N−2 flying capacitors are respectively connected to the first pair of connection nodes to the (N−2)th pair of connection nodes sequentially. When the multi-level DC/DC conversion circuit operates in a discontinuous conduction mode, the control module is configured to: regard the N−1 lower switches and the N−1 upper switches as N−1 main switches and N−1 synchronous rectification switches respectively; control the N−1 main switches to operate with a switching cycle and to turn on alternately with an interval time; and calculate a duty ratio of the N−1 synchronous rectification switches according to at least the input voltage, the output voltage, the interval time, the switching cycle and a duty ratio of the N−1 main switches.

In accordance with another aspect of the present disclosure, a control method of a multi-level DC/DC conversion circuit is provided. The multi-level DC/DC conversion circuit includes a positive input terminal, a negative input terminal, a positive output terminal, a negative output terminal, an inductor, and an N-level conversion circuit. The positive input terminal and the negative input terminal are configured to receive an input voltage. The positive output terminal and the negative output terminal are configured to provide an output voltage to a load, and the negative output terminal is connected to the negative input terminal. The inductor has a first terminal and a second terminal, and the first terminal of the inductor is electrically connected to the positive input terminal. N is a natural number greater than 2. The N-level conversion circuit includes N−1 upper switches, N−1 lower switches and N−2 flying capacitors. A first upper switch to an (N−1)th upper switch among the N−1 upper switches are electrically connected in series between the second terminal of the inductor and the positive output terminal sequentially and form a first upper connection node to an (N−2)th upper connection node sequentially. A first lower switch to an (N−1)th lower switch among the N−1 lower switches are electrically connected in series between the second terminal of the inductor and the negative output terminal sequentially and form a first lower connection node to an (N−2)th lower connection node sequentially. The first to (N−1)th lower switches are corresponding to the first to (N−1)th upper switches respectively, the first to (N−2)th upper connection nodes are corresponding to the first to (N−2)th lower connection nodes respectively, and the first to (N−2)th upper connection nodes and the first to (N−2)th lower connection nodes collectively form a first pair of connection nodes to an (N−2)th pair of connection nodes. The N−2 flying capacitors are respectively connected to the first pair of connection nodes to the (N−2)th pair of connection nodes sequentially. When the multi-level DC/DC conversion circuit operates in a discontinuous conduction mode, the control method includes: regarding the N−1 lower switches and the N−1 upper switches as N−1 main switches and N−1 synchronous rectification switches respectively; controlling the N−1 main switches to operate with a switching cycle and to turn on alternately with an interval time; and calculating a duty ratio of the N−1 synchronous rectification switches according to at least the input voltage, the output voltage, the interval time, the switching cycle and a duty ratio of the N−1 main switches.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
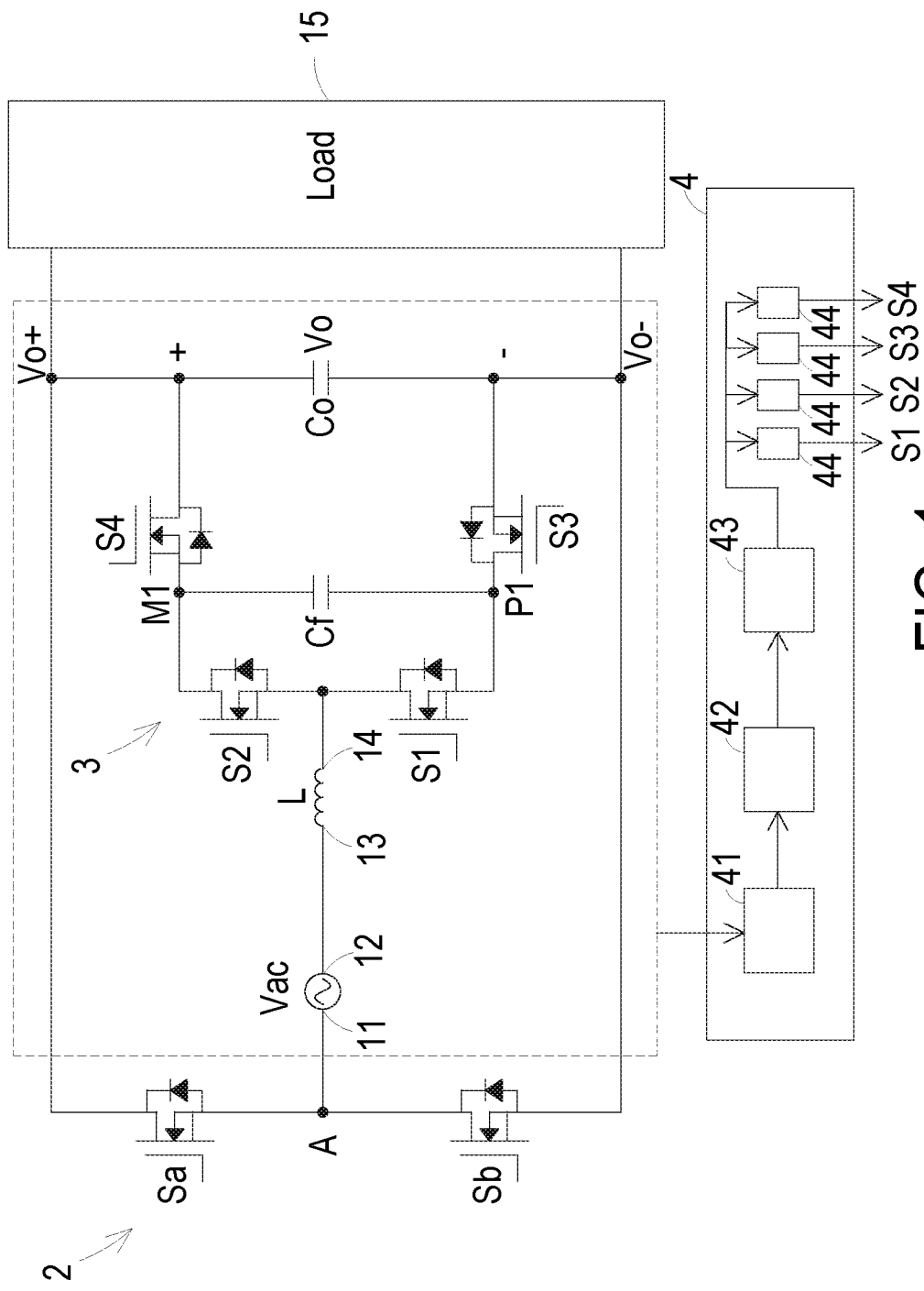
FIG. 1 is a schematic circuit diagram illustrating a multi-level AC/DC conversion circuit according to a first embodiment of the present disclosure.

Please refer to FIG. 1. FIG. 1 is a schematic circuit diagram illustrating a multi-level AC/DC conversion circuit according to a first embodiment of the present disclosure. As shown in FIG. 1, the multi-level AC/DC conversion circuit 1 in this embodiment is electrically connected between an input power source Vac and a load 15. The multi-level AC/DC conversion circuit 1 includes a first input terminal 11, a second input terminal 12, a positive output terminal Vo+, a negative output terminal Vo−, a switch bridge arm 2, an inductor L, an N-level conversion circuit 3, an output capacitor Co, and a control module 4, where N is a natural number greater than 2. The multi-level AC/DC conversion circuit 1 receives an AC input voltage Vin provided by the input power source Vac through the first input terminal 11 and the second input terminal 12, and provides a DC output voltage Vo to the load 15 through the positive output terminal Vo+ and the negative output terminal Vo−. The potential at the first input terminal 11 is lower than the potential at the second input terminal 12 when the AC input voltage Vin provided by the input power source Vac is in the positive half cycle, and the potential at the first input terminal 11 is higher than the potential at the second input terminal 12 when the AC input voltage Vin provided by the input power source Vac is in the negative half cycle.

The switch bridge arm 2 is electrically connected between the positive output terminal Vo+ and the negative output terminal Vo−, and includes a first switch Sa and a second switch Sb electrically connected in series. A common connection node A connecting the first switch Sa and the second switch Sb is connected to the first input terminal 11. When the AC input voltage Vin provided by the input power source Vac is in the positive half cycle, the first switch Sa is in the off state, and the second switch Sb is in the on state. When the AC input voltage Vin provided by the input power source Vac is in the negative half cycle, the first switch Sa is in the on state, and the second switch Sb is in the off state. The inductor L has a first terminal 13 and a second terminal 14, and the first terminal 13 of the inductor L is electrically connected to the second input terminal 12.

The N-level conversion circuit 3 includes (N−1) upper switches, (N−1) lower switches and (N−2) flying capacitors. In this embodiment, N equals 3, namely the N-level conversion circuit 3 of the multi-level AC/DC conversion circuit 1 in this embodiment is a three-level conversion circuit 3. As shown in FIG. 1, the three-level conversion circuit 3 includes two upper switches S2 and S4, two lower switches S1 and S3, and one flying capacitor Cf. The first upper switch S2 and the second upper switch S4 are electrically connected in series between the second terminal 14 of the inductor L and the positive output terminal Vo+ sequentially. The common connection node connecting the first upper switch S2 and the second upper switch S4 forms the first upper connection node M1. The two upper switches S2 and S4 operates with the switching cycle Ts and are turned on alternately with an interval time $T_\theta$, which is equal to Ts/(N−1) (i.e., Ts/2 in this embodiment). The first lower switch S1 and the second lower switch S3 are electrically connected in series between the second terminal 14 of the inductor L and the negative output terminal Vo− sequentially. The common connection node connecting the first lower switch S1 and the second lower switch S3 forms the first lower connection node P1. The two lower switches S1 and S3 operates with the switching cycle Ts and are turned on alternately with an interval time $T_\theta$, which is equal to Ts/(N−1) (i.e., Ts/2 in this embodiment). The first upper connection node M1 and the first lower connection node P1 are corresponding to each other and are defined as the first pair of connection nodes. The flying capacitor Cf is electrically connected between the first pair of connection nodes, namely the flying capacitor Cf is electrically connected between the first upper connection node M1 and the first lower connection node P1. The output capacitor Co is electrically connected between the positive output terminal Vo+ and the negative output terminal Vo−.

In this embodiment, when the AC input voltage Vin provided by the input power source Vac is in the positive half cycle, the two lower switches S1 and S3 serve as the main switches of the three-level conversion circuit 3, and the two upper switches S2 and S4 serve as the synchronous rectification switches of the three-level conversion circuit 3. When the AC input voltage Vin provided by the input power source Vac is in the negative half cycle, the two lower switches S1 and S3 serve as the synchronous rectification switches of the three-level conversion circuit 3, and the two upper switches S2 and S4 serve as the main switches of the three-level conversion circuit 3.

The control module 4 includes a sampling unit 41, a calculation unit 42, a control signal output unit 43, and 2N–2 driving units 44. The sampling unit 41 is electrically connected to the first input terminal 11, the second input terminal 12, the positive output terminal Vo+, the negative output terminal Vo–, the inductor L and the three-level conversion circuit 3. The sampling unit 41 samples information such as the AC input voltage Vin, the DC output voltage Vo, the current iL flowing through the inductor L and the voltage across the flying capacitor Cf.

The calculation unit 42 is electrically connected to the sampling unit 41 and performs calculations based on the information sampled by the sampling unit 41 to determine whether the multi-level AC/DC conversion circuit 1 operates in a continuous conduction mode or a discontinuous conduction mode. The calculation unit 42 also determines the potential difference between the first input terminal 11 and the second input terminal 12. In addition, a first preset value $\Delta d$ and a second preset value d are preset in the calculation unit 42. The first preset value $\Delta d$ is less than or equal to 0.1 (e.g., 0.05), and the second preset value d is less than or equal to 0.01 (e.g., 0.005).

The control signal output unit 43 is electrically connected to the calculation unit 42 and outputs a control signal based on the determination result provided by the calculation unit 42. In this embodiment, the number of the driving units 44 is equal to the total number of upper and lower switches. Each driving unit 44 is electrically connected to the control signal output unit 43 and the corresponding switch of the three-level conversion circuit 3. Further, each driving unit 44 controls the corresponding switch of the three-level conversion circuit 3 according to the control signal provided by the control signal output unit 43. For example, the driving unit 44 controls a main switch of the three-level conversion circuit 3 to turn on with its duty ratio, or the driving unit 44 controls a synchronous rectification switch of the three-level conversion circuit 3 to turn on with its duty ratio.

The following further explains how the calculation unit 42 determines whether the multi-level AC/DC conversion circuit 1 operates in continuous conduction mode (CCM) or discontinuous conduction mode (DCM), and how the control signal output unit 43 outputs the control signal according to the determination result. Meanwhile, the way of calculating the duty ratios of the main switch and synchronous rectification switch would be explained as well.

The calculation unit 42 calculates a CCM theoretical duty ratio of the main switch of the multi-level AC/DC conversion circuit 1 operating in CCM, and calculates a DCM theoretical duty ratio of the main switch of the multi-level AC/DC conversion circuit 1 operating in DCM. According to the comparison of the CCM and DCM theoretical duty ratios, the calculation unit 42 determines whether the multi-level AC/DC conversion circuit 1 operates in CCM or DCM. The way of calculating the CCM and DCM theoretical duty ratios is described as follows. The calculation unit 42 calculates the CCM theoretical duty ratio according to the AC input voltage Vin and the DC output voltage Vo, i.e., $$D_{CCM} = 1 - \frac{V\text{in}}{V o},$$

where $D_{CCM}$ is the CCM theoretical duty ratio. The calculation unit 42 calculates the DCM theoretical duty ratio according to the CCM theoretical duty ratio, the interval time $T_\theta$ of turning on the main switch, the switching cycle Ts, the current iL flowing through the inductor L, and the DC output voltage Vo, i.e., $$D_{DCM} = \frac{kT_\theta}{T_S} + \left[ \frac{2Li_L}{T_S V_o} \frac{D_{CCM} - \frac{kT_\theta}{T_S}}{\frac{(k+1)T_\theta}{T_S} - D_{CCM}} \right]^{\frac{1}{2}}$$

$$\frac{D_{CCM}T_S}{T_\theta} - 1 \leq k < \frac{D_{CCM}T_S}{T_\theta}$$

where $D_{DCM}$ is the DCM theoretical duty ratio, L is the inductance of the inductor L, and k is an integer.

The calculation unit 42 compares the CCM theoretical duty ratio with the DCM theoretical duty ratio to determine whether the multi-level AC/DC conversion circuit 1 currently operates in CCM or DCM. Further, the calculation unit 42 compares the potential at the first input terminal 11 with the potential at the second input terminal 12. According to present operation mode of the multi-level AC/DC conversion circuit 1 and the comparison result of the potentials at the first and second input terminals 11 and 12, the control signal output unit 43 outputs the corresponding control signal.

When the CCM theoretical duty ratio is less than or equal to the DCM theoretical duty ratio, the calculation unit 42 determines that the multi-level AC/DC conversion circuit 1 currently operates in CCM. Under this circumstance, if the calculation unit 42 determines that the potential at the first input terminal 11 is lower than the potential at the second input terminal 12, the control signal output unit 43 outputs a first CCM control signal to the driving units 44 based on the determination results from the calculation unit 42. According to the first CCM control signal, the driving units 44 control the two lower switches S1 and S3 (i.e., the main switches) of the three-level conversion circuit 3 to turn on and off with a duty ratio $D_{SW1}$ and control the two upper switches S2 and S4 (i.e., the synchronous rectification switches) of the three-level conversion circuit 3 to turn on and off with a duty ratio 1-$D_{SW1}$. Alternatively, when the calculation unit 42 determines that the multi-level AC/DC conversion circuit 1 currently operates in CCM and the potential at the first input terminal 11 is higher than the potential at the second input terminal 12, the control signal output unit 43 outputs a second CCM control signal to the driving units 44 based on the determination results from the calculation unit 42. According to the second CCM control signal, the driving units 44 control the two upper switches S2 and S4 (i.e., the main switches) of the three-level conversion circuit 3 to turn on and off with a duty ratio $D_{SW2}$ and control the two lower switches S1 and S3 (i.e., the synchronous rectification switches) of the three-level conversion circuit 3 to turn on and off with a duty ratio 1-$D_{SW2}$.

In addition, when the CCM theoretical duty ratio is greater than the DCM theoretical duty ratio, the calculation unit 42 determines that the multi-level AC/DC conversion circuit 1 currently operates in DCM. Under this circumstance, if the calculation unit 42 determines that the potential at the first input terminal 11 is lower than the potential at the second input terminal 12, the control signal output unit 43 outputs a first DCM control signal to the driving units 44 based on the determination results from the calculation unit 42. According to the first DCM control signal, the driving units 44 control the two lower switches S1 and S3 (i.e., the main switches) of the three-level conversion circuit 3 to turn on and off with the duty ratio $D_{SW1}$ and controls the two upper switches S2 and S4 (i.e., the synchronous rectification switches) of the three-level conversion circuit 3 to turn on and off with a duty ratio $D'_{sr\_DCM1}$. The duty ratio $D'_{sr\_DCM1}$ of the synchronous rectification switch is obtained by the following two equations.

$$D'_{sr\_DCM1} = \max[D_{sr\_DCM1} - \Delta d, 0] \quad (1)$$

$$D_{sr\_DCM1} = D_{SW1} \frac{\frac{(k_1+1)T_\theta}{T_S} - D_{CCM}}{D_{CCM} - \frac{k_1 T_\theta}{T_S}}, \quad \frac{D_{SW1}T_S}{T_\theta} - 1 \le k_1 < \frac{D_{SW1}T_S}{T_\theta} \quad (2)$$

In equations (1) and (2), $D_{sr\_DCM1}$ is a calculation value corresponding to the duty ratio of synchronous rectification switches. As shown in equation (1), the duty ratio $D'_{sr\_DCM1}$ of the synchronous rectification switch is equal to the larger one between zero and the value of subtracting the first preset value $\Delta d$ from the calculation value $D_{sr\_DCM1}$. In an embodiment, if the calculation value $D_{sr\_DCM1}$ is less than or equal to the first preset value $\Delta d$, i.e., $D_{sr\_DCM1} - \Delta d \le 0$, the duty ratio $D'_{sr\_DCM1}$ of the synchronous rectification switch is equal to zero.

When the calculation unit 42 determines that the multi-level AC/DC conversion circuit 1 currently operates in DCM and the potential at the first input terminal 11 is higher than the potential at the second input terminal 12, the control signal output unit 43 outputs a second DCM control signal to the driving units 44 based on the determination results from the calculation unit 42. According to the second DCM control signal, the driving units 44 control the two upper switches S2 and S4 (i.e., the main switches) of the three-level conversion circuit 3 to turn on and off with the duty ratio $D_{SW2}$ and controls the two lower switches S1 and S3 (i.e., the synchronous rectification switches) of the three-level conversion circuit 3 to turn on and off with a duty ratio $D'_{sr\_DCM2}$. The duty ratio $D'_{sr\_DCM2}$ of the synchronous rectification switch is obtained by the following two equations.

$$D'_{sr\_DCM2} = \max[D_{sr\_DCM2} - \Delta d, 0] \quad (3)$$

$$D_{sr\_DCM2} = D_{SW2} \frac{\frac{(k_2+1)T_\theta}{T_S} - D_{CCM}}{D_{CCM} - \frac{k_2 T_\theta}{T_S}}, \quad \frac{D_{SW2}T_S}{T_\theta} - 1 \le k_2 < \frac{D_{SW2}T_S}{T_\theta} \quad (4)$$

In equations (3) and (4), $D_{sr\_DCM2}$ is a calculation value corresponding to the duty ratio of synchronous rectification switches. As shown in equation (3), the duty ratio $D'_{sr\_DCM2}$ of the synchronous rectification switch is equal to the larger one between zero and the value of subtracting the first preset value $\Delta d$ from the calculation value $D_{sr\_DCM2}$. In an embodiment, if the calculation value $D_{sr\_DCM2}$ is less than or equal to the first preset value $\Delta d$, i.e., $D_{sr\_DCM2} - \Delta d \le 0$, the duty ratio $D'_{sr\_DCM2}$ of the synchronous rectification switch is equal to zero.

According to the above descriptions, the calculation for the duty ratio for the synchronous rectification switch of the three-level conversion circuit 3 is exemplified as follows. The interval time $T_\theta$ is equal to a half of the switching cycle Ts. When the multi-level AC/DC conversion circuit 1 operates in CCM, the turn-on cycle of the main switches of the three-level conversion circuit 3 is a duty ratio $D_{SW}$, and the turn-on cycle of the synchronous rectification switches of the three-level conversion circuit 3 is equal to 1-$D_{SW}$. When the multi-level AC/DC conversion circuit 1 operates in DCM, the turn-on cycle of the main switches of the three-level conversion circuit 3 is the duty ratio $D_{SW}$. Further, when $D_{SW}$<0.5, the duty ratio of the synchronous rectification switches of the three-level conversion circuit 3 is:

$$D'_{sr_{DCM}} = \max\left[D_{SW} \frac{\frac{(k_1+1)T_\theta}{T_S} - D_{CCM}}{D_{CCM} - \frac{k_1 T_\theta}{T_S}} - \Delta d, 0\right]$$

$$= \max\left[D_{SW} \frac{\frac{k_1+1}{2} - D_{CCM}}{D_{CCM} - \frac{k_1}{2}} - \Delta d, 0\right]$$

Since $$\frac{D_{SW}T_S}{T_\theta} - 1 \le k_1 < \frac{D_{SW}T_S}{T_\theta} \text{ (i.e., } 2D_{SW} - 1 \le k_1 < 2D_{SW}\text{),}$$

$k_1$ equals 0, and $$D'_{sr\_DCM} = \max\left[D_{SW} \frac{\frac{1}{2} - D_{CCM}}{D_{CCM}} - \Delta d, 0\right].$$

In addition, when 0.5<$D_{SW}$<1, the duty ratio of the synchronous rectification switches of the three-level conversion circuit 3 is:

$$D'_{sr\_DCM} = \max\left[D_{SW} \frac{\frac{(k_1+1)T_\theta}{T_S} - D_{CCM}}{D_{CCM} - \frac{k_1 T_\theta}{T_S}} - \Delta d, 0\right]$$

$$= \max\left[D_{SW} \frac{\frac{k_1+1}{2} - D_{CCM}}{D_{CCM} - \frac{k_1}{2}} - \Delta d, 0\right]$$

Since $$\frac{D_{SW}T_S}{T_\theta} - 1 \le k_1 < \frac{D_{SW}T_S}{T_\theta} \text{ (i.e., } 2D_{SW} - 1 \le k_1 < 2D_{SW}\text{),}$$

$k_1$ equals 1, and $$D'_{sr\_DCM} = \max\left[D_{SW}\frac{1-D_{CCM}}{D_{CCM}-\frac{1}{2}} - \Delta d,\, 0\right].$$

Figure 2:
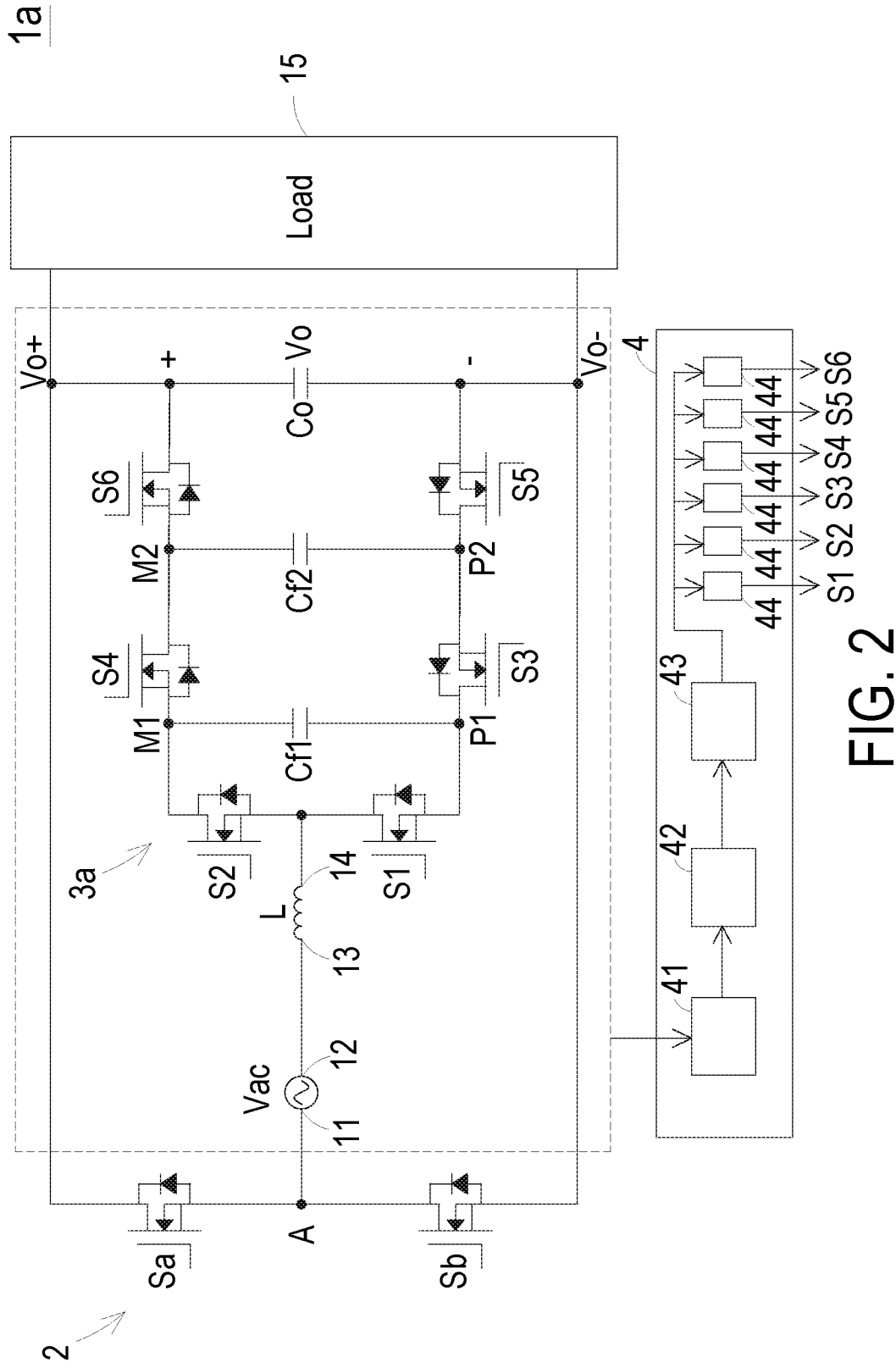
FIG. 2 is a schematic circuit diagram illustrating a multi-level AC/DC conversion circuit according to a second embodiment of the present disclosure.

In some embodiments, the N-level conversion circuit of the multi-level AC/DC conversion circuit is not limited to the three-level conversion circuit shown in FIG. 1 and may be a four-level conversion circuit as an example. FIG. 2 is a schematic circuit diagram illustrating a multi-level AC/DC conversion circuit according to a second embodiment of the present disclosure. As shown in FIG. 2, in the multi-level AC/DC conversion circuit 1a of this embodiment, N equals 4, and the N-level conversion circuit is a four-level conversion circuit 3a. The four-level conversion circuit 3a includes three upper switches S2, S4 and S6, three lower switches S1, S3 and S5, and two flying capacitors including the first flying capacitor Cf1 and the second flying capacitor Cf2.

The first upper switch S2, the second upper switch S4 and the third upper switch S6 are electrically connected in series between the second terminal 14 of the inductor L and the positive output terminal Vo+ sequentially. The common connection node connecting the first upper switch S2 and the second upper switch S4 forms the first upper connection node M1, and the common connection node connecting the second upper switch S4 and the third upper switch S6 forms the second upper connection node M2. The three upper switches S2, S4 and S6 operates with the switching cycle Ts and are turned on alternately with the interval time $T_\theta$, which is equal to Ts/(N−1) (i.e., Ts/3 in this embodiment). The second lower switch S3 and the third lower switch S5 are electrically connected in series between the second terminal 14 of the inductor L and the negative output terminal Vo− sequentially. The common connection node connecting the first lower switch S1 and the second lower switch S3 forms the first lower connection node P1, and the common connection node connecting the second lower switch S3 and the third lower switch S5 forms the second lower connection node P2. The three lower switches S1, S3 and S5 operates with the switching cycle Ts and are turned on alternately with the interval time $T_\theta$, which is equal to Ts/(N−1) (i.e., Ts/3 in this embodiment). The first upper connection node M1 and the first lower connection node P1 are corresponding to each other and form the first pair of connection nodes. The second upper connection node M2 and the second lower connection node P2 are corresponding to each other and form the second pair of connection nodes. The first flying capacitor Cf1 is electrically connected between the first pair of connection nodes, namely the first flying capacitor Cf1 is electrically connected between the first upper connection node M1 and the first lower connection node P1. The second flying capacitor Cf2 is electrically connected between the second pair of connection nodes, namely the second flying capacitor Cf2 is electrically connected between the second upper connection node M2 and the second lower connection node P2. The way of the control module 4 controlling the four-level conversion circuit 3a of the multi-level AC/DC conversion circuit 1a in this embodiment is similar to the way of the control module 4 controlling the three-level conversion circuit 3 of the multi-level AC/DC conversion circuit 1 in the first embodiment, and thus the detailed descriptions thereof are omitted herein.

The calculation for the duty ratio for the synchronous rectification switch of the four-level conversion circuit 3a of the multi-level AC/DC conversion circuit 1a is exemplified as follows. The interval time $T_\theta$ is equal to ⅓ of the switching cycle Ts. When the multi-level AC/DC conversion circuit 1a operates in CCM, the turn-on cycle of the main switches of the four-level conversion circuit 3a is the duty ratio $D_{SW}$, and the turn-on cycle of the synchronous rectification switches of the four-level conversion circuit 3a is equal to 1-$D_{SW}$. When the multi-level AC/DC conversion circuit 1a operates in DCM, the turn-on cycle of the main switches of the four-level conversion circuit 3a is the duty ratio $D_{SW}$. Further, when $D_{SW}$<⅓, the duty ratio of the synchronous rectification switches of the four-level conversion circuit 3a is:

$$D'_{sr\_DCM} = \max\left[D_{SW}\frac{\frac{k_1+1}{3}-D_{CCM}}{D_{CCM}-\frac{k_1}{3}} - \Delta d,\, 0\right]$$

Since $$\frac{D_{SW}T_S}{T_\theta} - 1 \le k_1 < \frac{D_{SW}T_S}{T_\theta}\ \text{(i.e., } 3D_{SW}-1 \le k_1 < 3D_{SW}\text{),}$$

$k_1$ equals 0, and $$D'_{sr\_DCM} = \max\left[D_{SW}\frac{\frac{1}{3}-D_{CCM}}{D_{CCM}} - \Delta d,\, 0\right].$$

In addition, when ⅓<$D_{SW}$<⅔, the duty ratio of the synchronous rectification switches of the four-level conversion circuit 3a is:

$$D'_{sr\_DCM} = \max\left[D_{SW}\frac{\frac{k_1+1}{3}-D_{CCM}}{D_{CCM}-\frac{k_1}{3}} - \Delta d,\, 0\right]$$

Since $$\frac{D_{SW}T_S}{T_\theta} - 1 \le k_1 < \frac{D_{SW}T_S}{T_\theta}\ \text{(i.e., } 3D_{SW}-1 \le k_1 < 3D_{SW}\text{),}$$

$k_1$ equals 1, and $$D'_{sr\_DCM} = \max\left[D_{SW}\frac{\frac{2}{3}-D_{CCM}}{D_{CCM}-\frac{1}{3}} - \Delta d,\, 0\right].$$

Moreover, when ⅔<$D_{SW}$<1, the duty ratio of the synchronous rectification switches of the four-level conversion circuit 3a is:

$$D'_{sr\_DCM} = \max\left[D_{SW}\frac{\frac{k_1+1}{3}-D_{CCM}}{D_{CCM}-\frac{k_1}{3}} - \Delta d,\, 0\right]$$

Since $$\frac{D_{SW}T_S}{T_\theta} - 1 \le k_1 < \frac{D_{SW}T_S}{T_\theta} \text{ (i.e., } 3D_{SW} - 1 \le k_1 < 3D_{SW}),$$

$k_1$ equals 2, and $$D'_{sr\_DCM} = \max\left[D_{sw}\frac{1 - D_{CCM}}{D_{CCM} - \frac{2}{3}} - \Delta d, 0\right].$$

Figure 3:
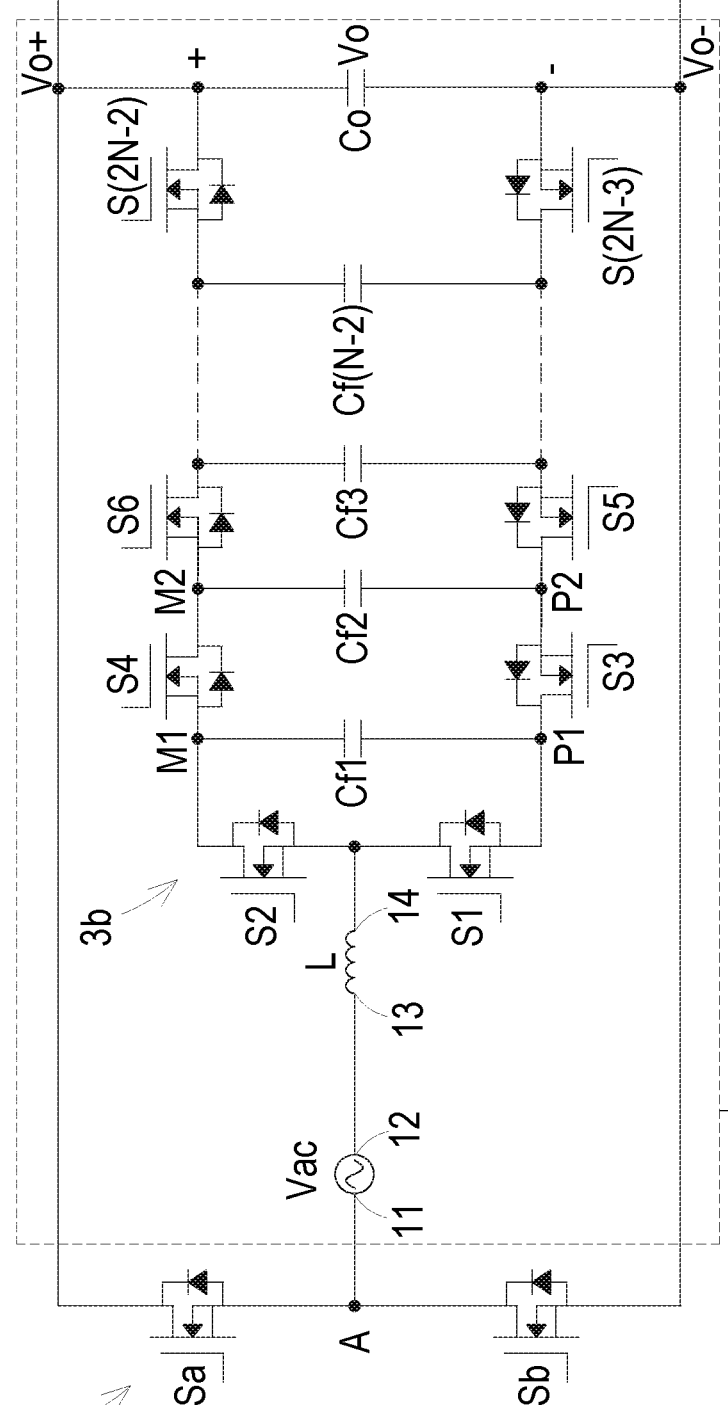
FIG. 3 is a schematic circuit diagram illustrating a multi-level AC/DC conversion circuit according to a third embodiment of the present disclosure.

In some embodiments, the N-level conversion circuit of the multi-level AC/DC conversion circuit may have more levels. FIG. 3 is a schematic circuit diagram illustrating a multi-level AC/DC conversion circuit according to a third embodiment of the present disclosure. As shown in FIG. 3, in the multi-level AC/DC conversion circuit 1b of this embodiment, the N-level conversion circuit 3b includes N−1 upper switches, N−1 lower switches, and N−2 flying capacitors. The configuration and control method for the N-level conversion circuit 3b are similar to that for the three-level conversion circuit 3 shown in FIG. 1, and thus the detailed descriptions thereof are omitted herein.

Figure 4:
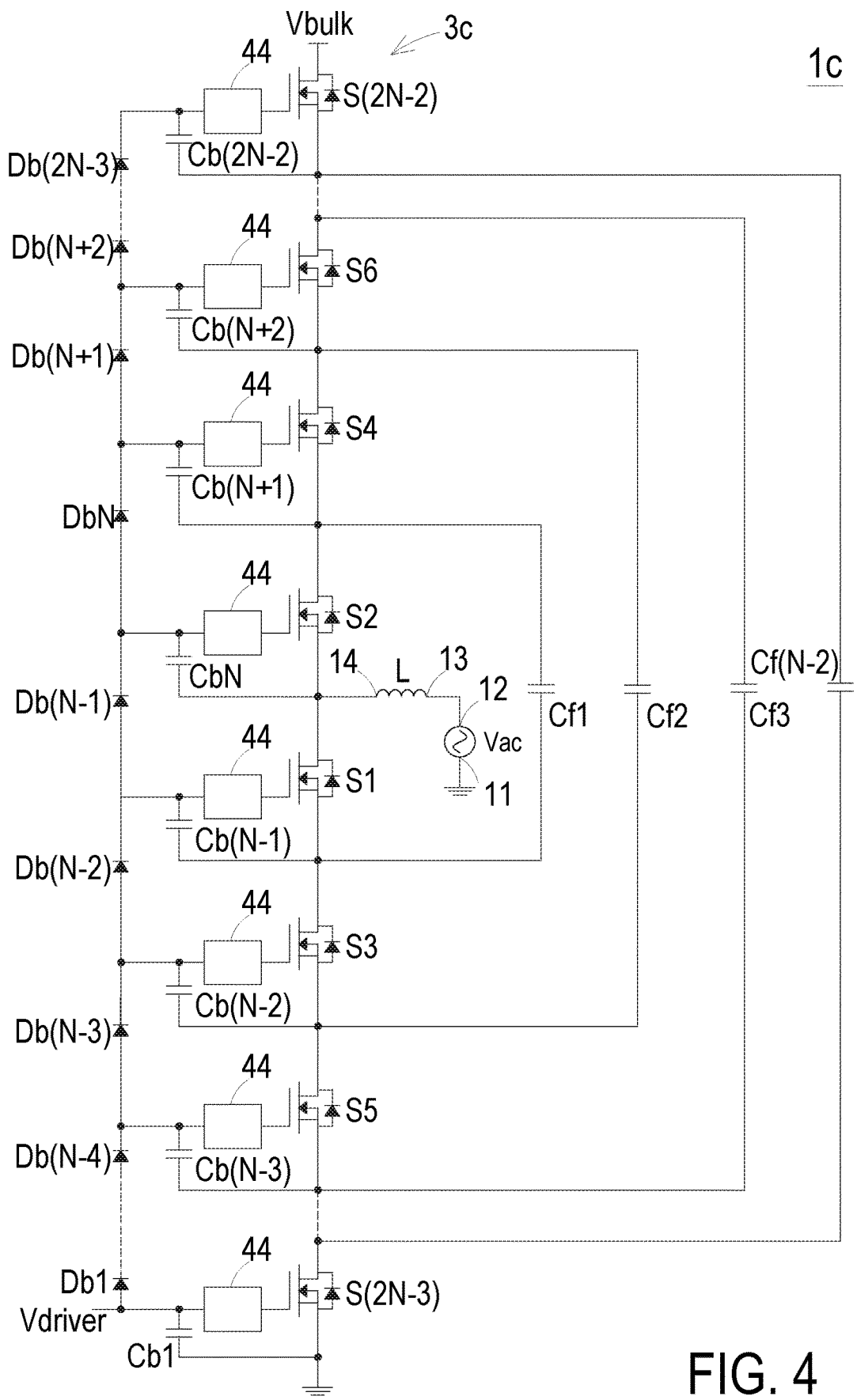
FIG. 4 is a schematic circuit diagram illustrating a multi-level AC/DC conversion circuit according to a fourth embodiment of the present disclosure.

In an embodiment, the multi-level AC/DC conversion circuit may be operated using bootstrap power supply, namely each driving unit of switch is powered through the corresponding diode and driving power capacitor. FIG. 4 is a schematic circuit diagram illustrating a multi-level AC/DC conversion circuit according to a fourth embodiment of the present disclosure. In order to show the circuit topology clearly, regarding the control module of the multi-level AC/DC conversion circuit 1c, only the driving units 44 are shown, and the sampling unit 41, calculation unit 42, and control signal output unit 43 shown in FIG. 3 are omitted herein. It can be understood that the circuit structure and control method of the control module in this embodiment are similar to that of control module 4, including the sampling unit 41, calculation unit 42, and control signal output unit 43, shown in FIG. 3. Compared with the multi-level AC/DC conversion circuit 1b shown in FIG. 3, the multi-level AC/DC conversion circuit 1c in this embodiment further includes 2N−3 diodes Db (Db1 to Db(2N−3)) and 2N−2 driving power capacitors Cb (Cb1 to Cb(2N−2)). All the diodes Db are electrically connected in series between the driving unit 44 electrically connected to the last upper switch S(2N−2) and the driving unit 44 electrically connected to the last lower switch S(2N−3). Each diode Db is further electrically connected between the corresponding two adjacent driving units 44. Each driving power capacitor Cb is electrically connected between the corresponding driving unit 44 and the corresponding flying capacitor.

In this embodiment, due to the disposing of the diodes Db and driving power capacitors Cb, the calculation for the duty ratio of synchronous rectification switches is different from that in the above embodiments and is described as follows. When the CCM theoretical duty ratio is greater than the DCM theoretical duty ratio, the calculation unit 42 determines that the multi-level AC/DC conversion circuit 1c currently operates in DCM. Under this circumstance, if the calculation unit 42 determines that the potential at the first input terminal 11 is lower than the potential at the second input terminal 12, the control signal output unit 43 outputs a first DCM control signal to the driving units 44 based on the determination results from the calculation unit 42. According to the first DCM control signal, the driving units 44 control all the lower switches (i.e., the main switches) of the N-level conversion circuit 3c to turn on and off with the duty ratio $D_{SW1}$ and controls all the upper switches (i.e., the synchronous rectification switches) of the N-level conversion circuit 3c to turn on and off with a duty ratio $D'_{sr\_DCM1}$. The duty ratio $D'_{sr\_DCM1}$ of the synchronous rectification switch is obtained by the following two equations.

$$D'_{sr\_DCM1} = \max[D_{sr\_DCM1} - \Delta d, 0, d] \quad (5)$$

$$D_{sr\_DCM1} = D_{SW1}\frac{\frac{(k_1 + 1)T_\theta}{T_S} - D_{CCM}}{D_{CCM} - \frac{k_1 T_\theta}{T_S}}, \frac{D_{SW1}T_S}{T_\theta} - 1 \le k_1 < \frac{D_{SW1}T_S}{T_\theta} \quad (6)$$

In equations (5) and (6), $D_{sr\_DCM1}$ is a calculation value corresponding to the duty ratio of synchronous rectification switches. As shown in equation (5), the duty ratio $D'_{sr\_DCM1}$ of the synchronous rectification switch is equal to the largest one among the value of subtracting the first preset value $\Delta d$ from the calculation value $D_{sr\_DCM1}$ zero, and the second preset valued. In an embodiment, if the calculation value $D_{sr\_DCM1}$ is less than or equal to the second preset value d, the duty ratio $D'_{sr\_DCM1}$ of the synchronous rectification switch is equal to the second preset value d.

When the calculation unit 42 determines that the multi-level AC/DC conversion circuit 1c currently operates in DCM and the potential at the first input terminal 11 is higher than the potential at the second input terminal 12, the control signal output unit 43 outputs a second DCM control signal to the driving units 44 based on the determination results from the calculation unit 42. According to the second DCM control signal, the driving units 44 control all the upper switches (i.e., the main switches) of the N-level conversion circuit 3c to turn on and off with the duty ratio $D_{SW2}$ and controls all the lower switches (i.e., the synchronous rectification switches) of the N-level conversion circuit 3c to turn on and off with a duty ratio $D'_{sr\_DCM2}$. The duty ratio $D'_{sr\_DCM2}$ of the synchronous rectification switch is obtained by the following two equations.

$$D'_{sr\_DCM2} = \max[D_{sr\_DCM2} - \Delta d, 0, d] \quad (7)$$

$$D_{sr\_DCM2} = D_{SW2}\frac{\frac{(k_2 + 1)T_\theta}{T_S} - D_{CCM}}{D_{CCM} - \frac{k_2 T_\theta}{T_S}}, \frac{D_{SW2}T_S}{T_\theta} - 1 \le k_2 < \frac{D_{SW2}T_S}{T_\theta} \quad (8)$$

In equations (7) and (8), $D_{sr\_DCM2}$ is a calculation value corresponding to the duty ratio of synchronous rectification switches. As shown in equation (7), the duty ratio $D'_{sr\_DCM2}$ of the synchronous rectification switch is equal to the largest one among the value of subtracting the first preset value $\Delta d$ from the calculation value $D_{sr\_DCM2}$, zero, and the second preset valued. In an embodiment, if the calculation value $D_{sr\_DCM2}$ is less than or equal to the second preset value d, the duty ratio $D'_{sr\_DCM2}$ of the synchronous rectification switch is equal to the second preset value d.

Figure 5:
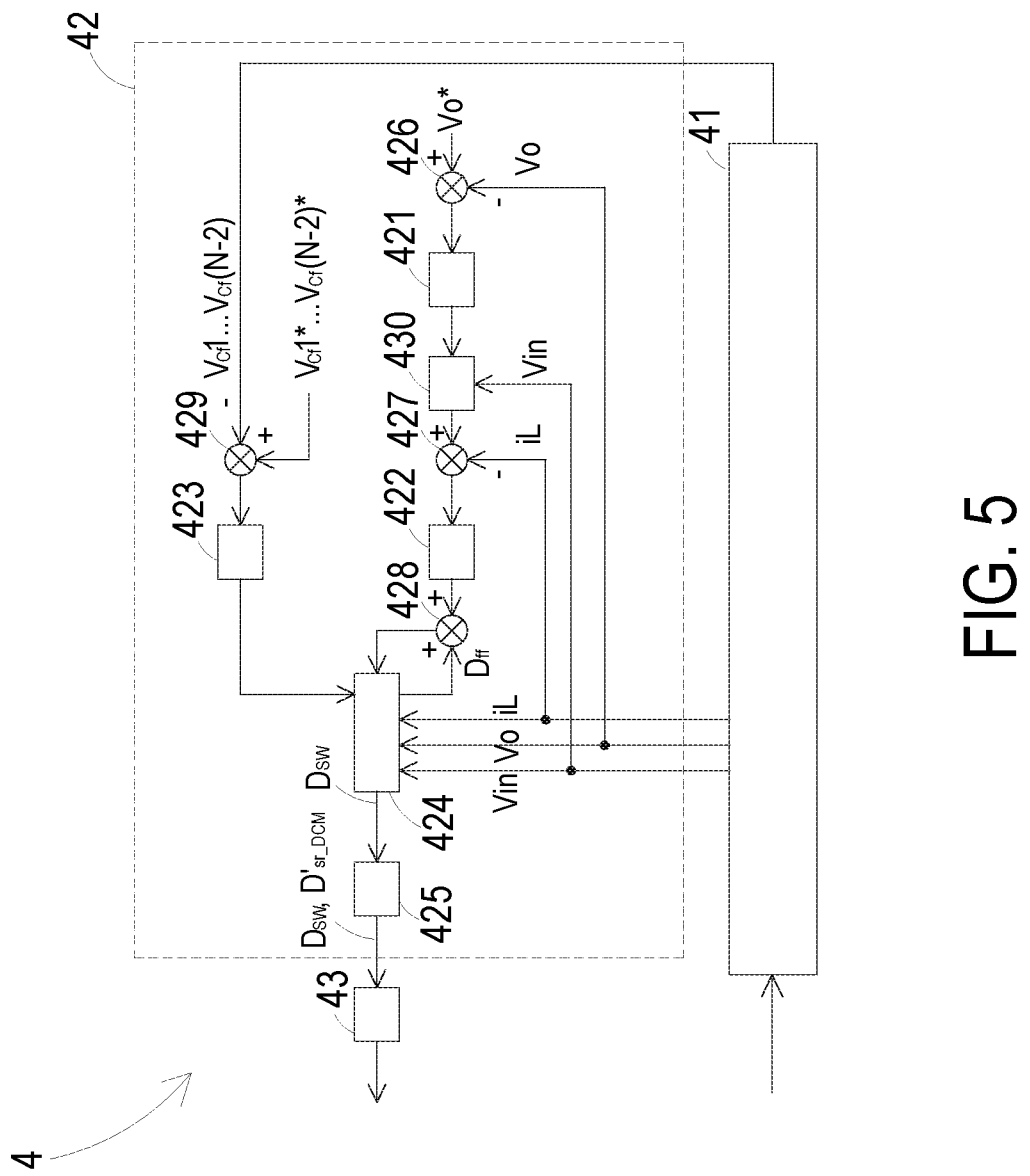
FIG. 5 is a schematic circuit diagram illustrating a first implementation of the control module of the multi-level AC/DC conversion circuit shown in FIG. 3.

The detailed circuit topology inside the calculation unit of the control module of the multi-level AC/DC conversion circuit is exemplified as follows. Please refer to FIG. 5 with FIG. 3. FIG. 5 is a schematic circuit diagram illustrating a first implementation of the control module of the multi-level AC/DC conversion circuit shown in FIG. 3. As shown in FIG. 5, the calculation unit 42 includes an output voltage control unit 421, a current control unit 422, a flying capacitor voltage control unit 423, a main switch duty ratio calculation unit 424, a synchronous rectification switch duty ratio calculation unit 425, a first comparator 426, a second comparator 427, an adder 428, a third comparator 429, and a reference current generating unit 430. The first comparator 426 outputs a first comparison result according to the difference between a preset reference voltage Vo* and the DC output voltage Vo. The output voltage control unit 421 outputs a first compensation value according to the first comparison result. The reference current generating unit 430 outputs a reference current according to the first compensation value and the AC input voltage Vin. The second comparator 427 outputs a second comparison result according to the difference between the reference current and the current iL flowing through the inductor L. The current control unit 422 outputs a second compensation value according to the second comparison result. The main switch duty ratio calculation unit 424 calculates a feedforward duty ratio $D_{ff}$, and the adder 428 outputs a third compensation value according to the sum of the second compensation value and the feedforward duty ratio $D_{ff}$. The third comparator 429 outputs a third comparison result according to the difference between a preset flying capacitor reference voltage $V_{Cf}^*$ and a flying capacitor voltage $V_{Cf}$ across the flying capacitor Cf. The flying capacitor voltage control unit 423 outputs a duty ratio adjustment value according to the third comparison result. The main switch duty ratio calculation unit 424 outputs the duty ratio $D_{SW}$ of main switch according to the AC input voltage Vin, the DC output voltage Vo, the current iL flowing through the inductor L, the third compensation value, and the duty ratio adjustment value. The synchronous rectification switch duty ratio calculation unit 425 outputs the duty ratio $D'_{sr\_DCM}$ of synchronous rectification switch according to the duty ratio $D_{SW}$ of main switch, and sends the duty ratio $D_{SW}$ and $D'_{sr\_DCM}$ to the control signal output unit 43. Accordingly, the control signal output unit 43 outputs the control signal according to the duty ratios of switches.

Figure 6:
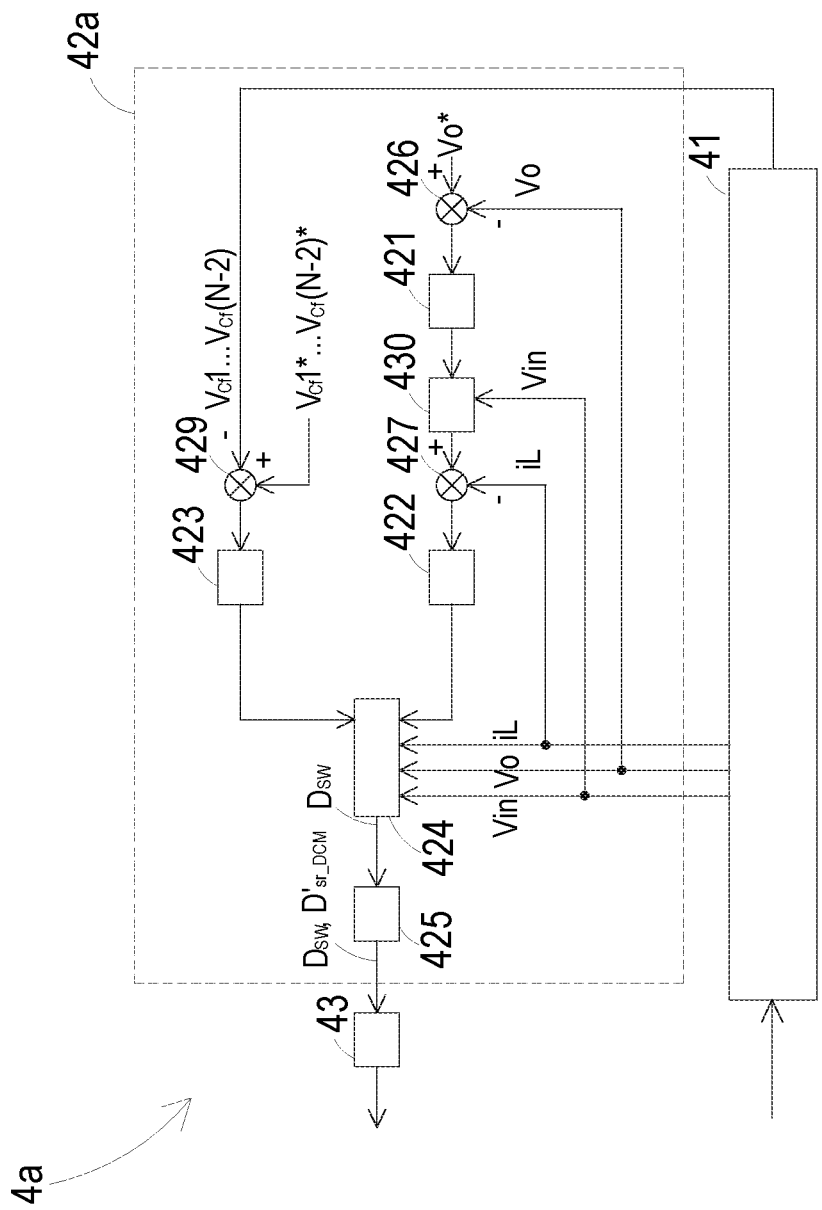
FIG. 6 is a schematic circuit diagram illustrating a second implementation of the control module of the multi-level AC/DC conversion circuit shown in FIG. 3.

In some embodiments, the main switch duty ratio calculation unit 424 is not limited to receive the third compensation value outputted according to the sum of the second compensation value and the feedforward duty ratio $D_{ff}$, and may directly receive the second compensation value provided by the current control unit 422. Please refer to FIG. 6 with FIG. 3. FIG. 6 is a schematic circuit diagram illustrating a second implementation of the control module of the multi-level AC/DC conversion circuit shown in FIG. 3. Compared with the main switch duty ratio calculation unit 424 of the calculation unit 42 of the control module 4 shown in FIG. 5, which receives the third compensation value, the main switch duty ratio calculation unit 424 of the calculation unit 42a of the control module 4a in this embodiment directly receives the second compensation value provided by the current control unit 422. In this embodiment, the main switch duty ratio calculation unit 424 outputs the duty ratio $D_{SW}$ of main switch according to the AC input voltage Vin, the DC output voltage Vo, the current iL flowing through the inductor L, the second compensation value, and the duty ratio adjustment value. The synchronous rectification switch duty ratio calculation unit 425 outputs the duty ratio $D'_{sr\_DCM}$ of synchronous rectification switch according to the duty ratio $D_{SW}$ of main switch, and sends the duty ratio $D_{SW}$ and $D'_{sr\_DCM}$ to the control signal output unit 43. Accordingly, the control signal output unit 43 outputs the control signal according to the duty ratios of switches.

Figure 7:
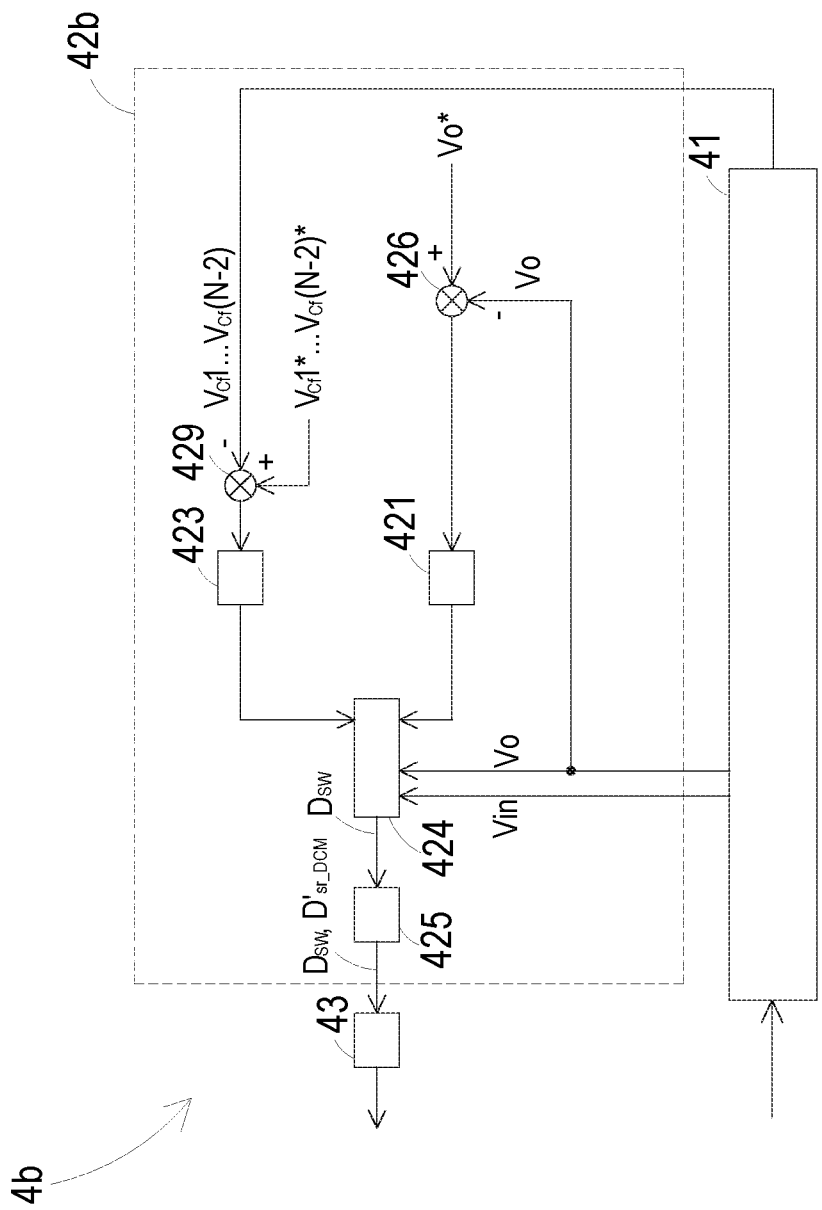
FIG. 7 is a schematic circuit diagram illustrating a third implementation of the control module of the multi-level AC/DC conversion circuit shown in FIG. 3.

In some embodiments, the calculation unit may not include the current control unit, and the main switch duty ratio calculation unit 424 directly receives the first compensation value outputted by the output voltage control unit 421. Please refer to FIG. 7 with FIG. 3. FIG. 7 is a schematic circuit diagram illustrating a third implementation of the control module of the multi-level AC/DC conversion circuit shown in FIG. 3. Compared with the main switch duty ratio calculation unit 424 of the calculation unit 42 of the control module 4 shown in FIG. 5, which receives the third compensation value, the main switch duty ratio calculation unit 424 of the calculation unit 42b of the control module 4b in this embodiment directly receives the first compensation value provided by the output voltage control unit 421. In this embodiment, the main switch duty ratio calculation unit 424 outputs the duty ratio $D_{SW}$ of main switch according to the AC input voltage Vin, the DC output voltage Vo, the first compensation value and the duty ratio adjustment value. The synchronous rectification switch duty ratio calculation unit 425 outputs the duty ratio $D'_{sr\_DCM}$ of synchronous rectification switch according to the duty ratio $D_{SW}$ of main switch, and sends the duty ratio $D_{SW}$ and $D'_{sr\_DCM}$ to the control signal output unit 43. Accordingly, the control signal output unit 43 outputs the control signal according to the duty ratios of switches.

Figure 8:
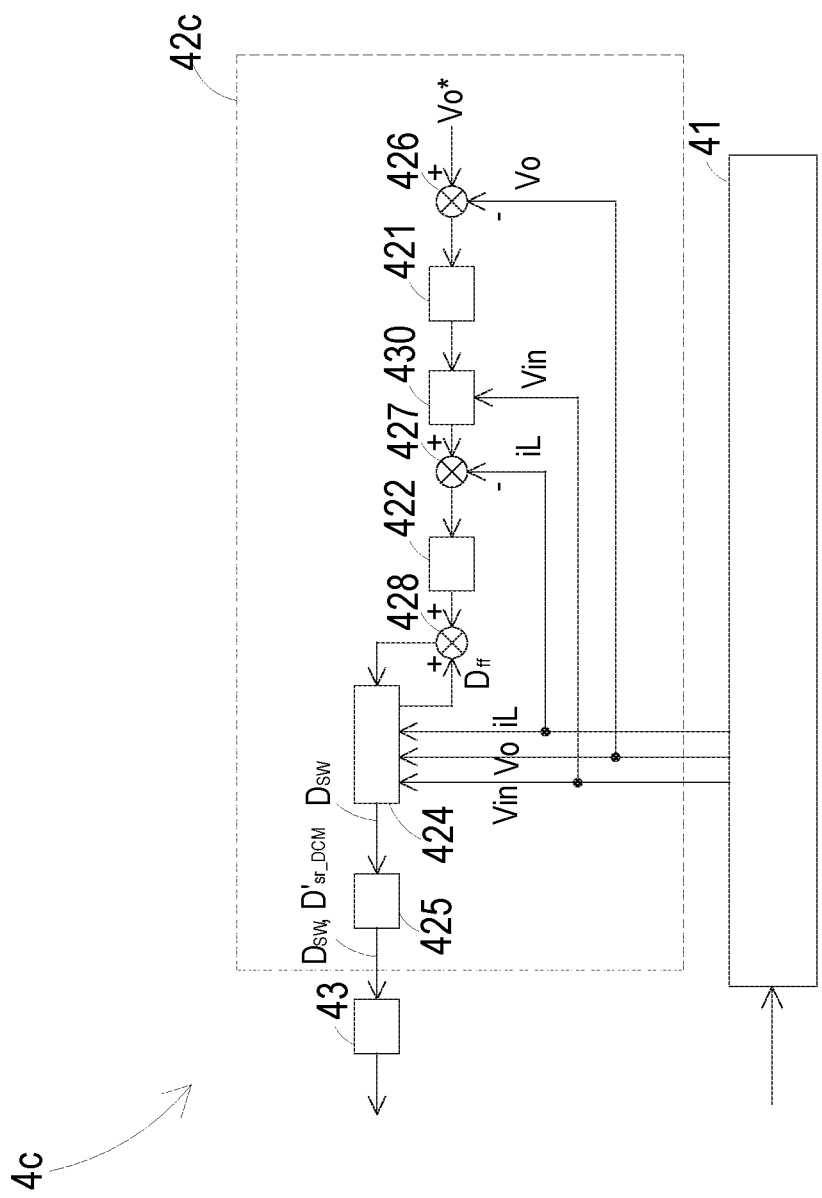
FIG. 8 is a schematic circuit diagram illustrating a fourth implementation of the control module of the multi-level AC/DC conversion circuit shown in FIG. 3.

In some embodiments, the calculation unit may not include the flying capacitor voltage control unit. Please refer to FIG. 8 with FIG. 3. FIG. 8 is a schematic circuit diagram illustrating a fourth implementation of the control module of the multi-level AC/DC conversion circuit shown in FIG. 3. The control module 42c in this embodiment doesn't include the flying capacitor voltage control unit. Further, in this embodiment, it is not necessary for the main switch duty ratio calculation unit 424 to receive the duty ratio adjustment value, and the main switch duty ratio calculation unit 424 can output the duty ratio $D_{SW}$ of main switch according to the AC input voltage Vin, the DC output voltage Vo, the current iL flowing through the inductor L and the third compensation value. The synchronous rectification switch duty ratio calculation unit 425 outputs the duty ratio $D'_{sr\_DCM}$ of synchronous rectification switch according to the duty ratio $D_{SW}$ of main switch, and sends the duty ratio $D_{SW}$ and $D'_{sr\_DCM}$ to the control signal output unit 43. Accordingly, the control signal output unit 43 outputs the control signal according to the duty ratios of switches.

It is noted that detailed circuit topologies of calculation unit of the above-mentioned implementations of control module may be applied to other conversion circuit of the present disclosure, and the detailed descriptions thereof are omitted herein.

Figure 9:
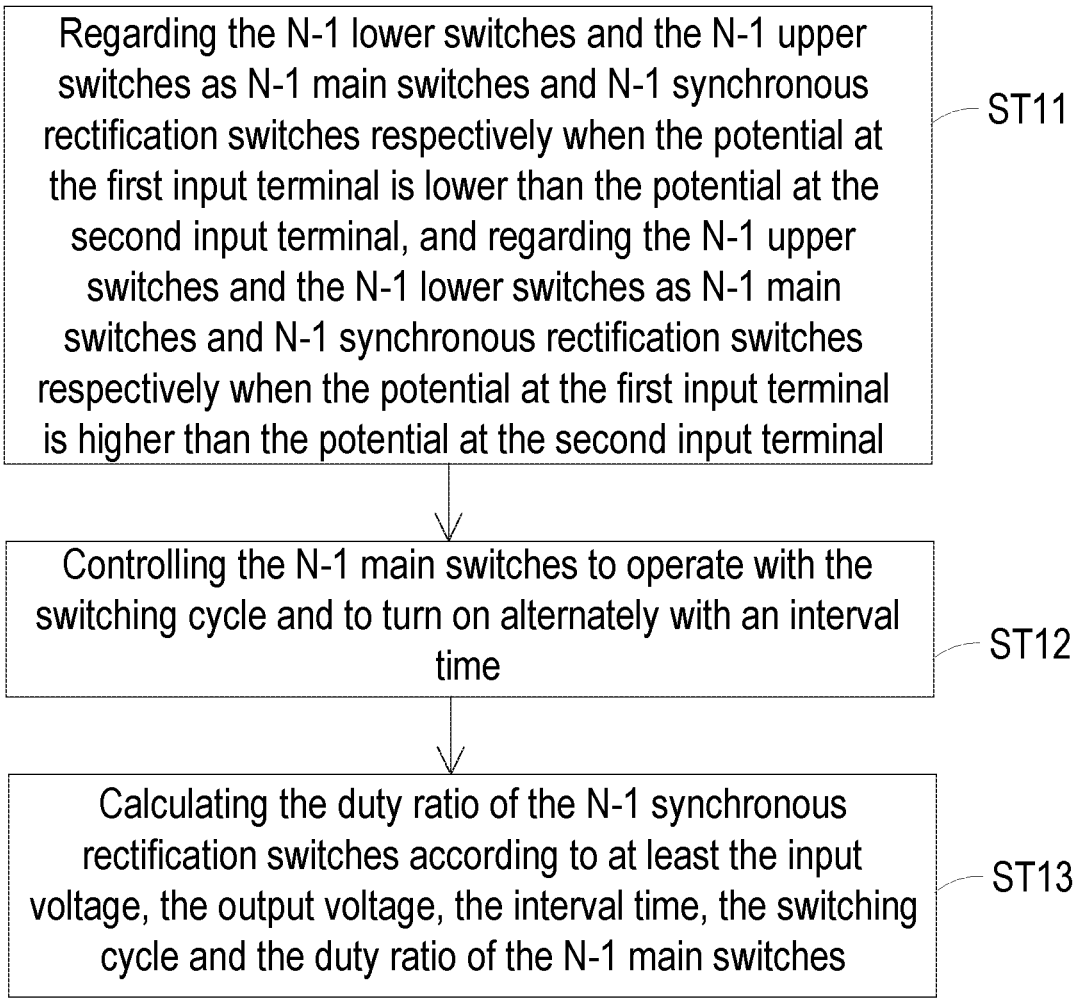
FIG. 9 is a schematic flow chart illustrating a control method of the multi-level AC/DC conversion circuit shown in FIG. 3 operating in discontinuous conduction mode.

Please refer to FIG. 9. FIG. 9 is a schematic flow chart illustrating a control method of the multi-level AC/DC conversion circuit shown in FIG. 3 operating in DCM. As shown in FIG. 9, firstly, in the step ST11, when the potential at the first input terminal 11 is lower than the potential at the second input terminal 12, the N−1 lower switches are regarded as N−1 main switches, and the N−1 upper switches are regarded as N−1 synchronous rectification switches. Further, when the potential at the first input terminal 11 is higher than the potential at the second input terminal 12, the N−1 upper switches are regarded as N−1 main switches, and the N−1 lower switches are regarded as N−1 synchronous rectification switches. Then, in the step ST12, the N−1 main switches are controlled to operate with the switching cycle Ts and to turn on alternately with an interval time $T_0$. Finally, in the step ST13, the duty ratio of the N−1 synchronous rectification switches is calculated according to at least the input voltage Vin, the output voltage Vo, the interval time $T_\theta$, the switching cycle Ts and the duty ratio of the N−1 main switches.

Figure 10:
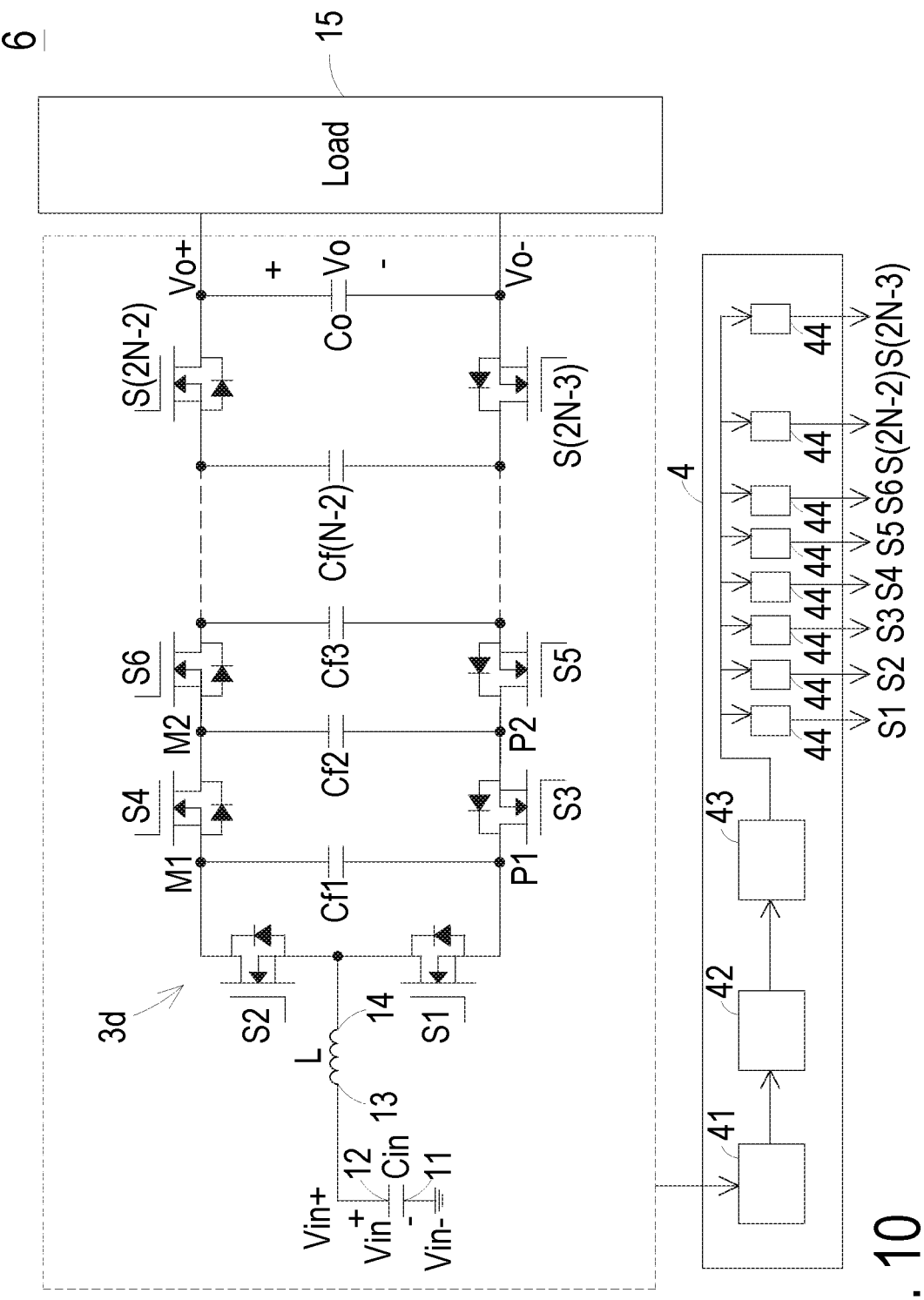
FIG. 10 is a schematic circuit diagram illustrating a multi-level DC/DC conversion circuit according to an embodiment of the present disclosure.

Please refer to FIG. 10. FIG. 10 is a schematic circuit diagram illustrating a multi-level DC/DC conversion circuit according to an embodiment of the present disclosure. As shown in FIG. 10, the multi-level DC/DC conversion circuit 6 receives a DC input voltage Vin, converts the DC input voltage Vin into a DC output voltage Vo, and provides the DC output voltage Vo to the load 15. The multi-level DC/DC conversion circuit 6 includes a positive input terminal Vin+, a negative input terminal Vin−, an input capacitor Cin, a positive output terminal Vo+, a negative output terminal Vo−, an inductor L, an N-level conversion circuit 3d, an output capacitor Co, and a control module 4. The circuit structure of the positive output terminal Vo+, the negative output terminal Vo−, the inductor L, the N-level conversion circuit 3d, the output capacitor Co and the control module 4 of the multi-level DC/DC conversion circuit 6 is similar to the circuit structure of the positive output terminal Vo+, the negative output terminal Vo−, the inductor L, the N-level conversion circuit 3b, the output capacitor Co and the control module 4 of the multi-level AC/DC conversion circuit 1b shown in FIG. 3, and thus the detailed descriptions thereof are omitted herein. In this embodiment, the multi-level DC/DC conversion circuit 6 receives the DC input voltage Vin through the positive input terminal Vin+ and the negative input terminal Vin−, and the negative input terminal Vin− is connected to the negative output terminal Vo−. The first terminal 13 of the inductor L is electrically connected to the positive input terminal Vin+, and the second terminal 14 of the inductor L is electrically connected to the N-level conversion circuit 3d. The input capacitor Cin is electrically connected between the positive input terminal Vin+ and the negative input terminal Vin−.

In addition, in this embodiment, all the lower switches serve as the main switches of the N-level conversion circuit 3d, and all the upper switches serve as the synchronous rectification switches of the N-level conversion circuit 3d. The control method for this embodiment is similar to the control method for the above-mentioned multi-level AC/DC conversion circuit with the AC input voltage Vin, provided by the input power source Vac, being in the positive half cycle.

Figure 11:
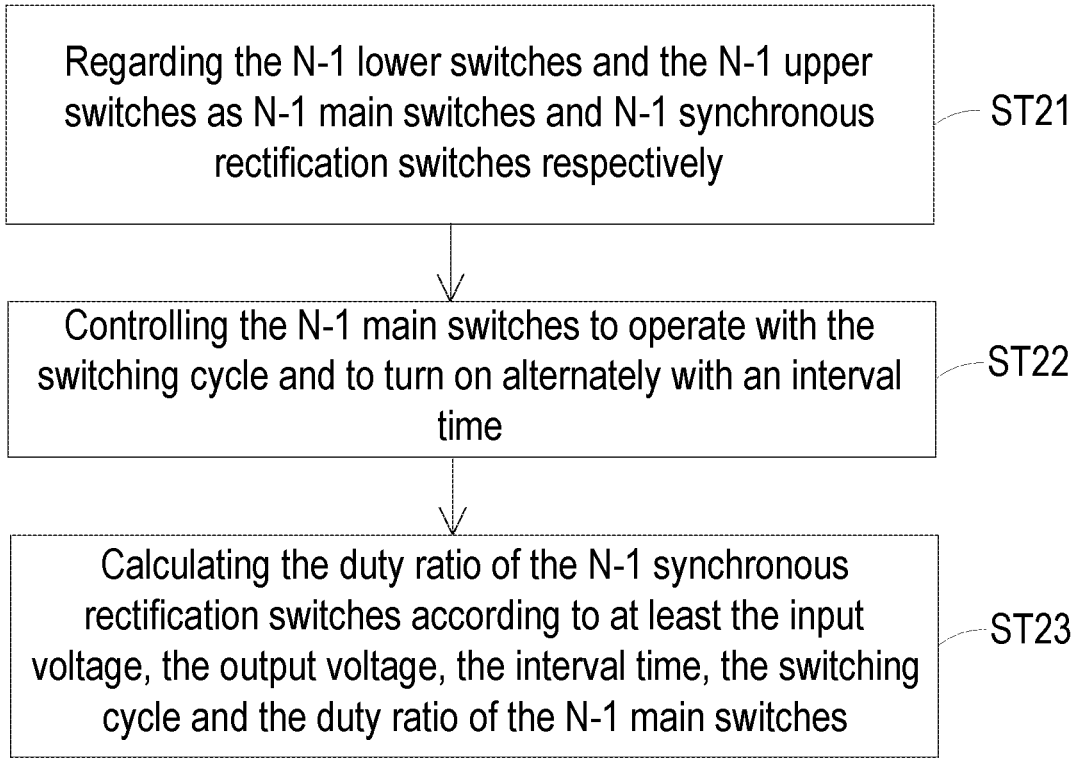
FIG. 11 is a schematic flow chart illustrating a control method of the multi-level DC/DC conversion circuit shown in FIG. 10 operating in discontinuous conduction mode.

Please refer to FIG. 11. FIG. 11 is a schematic flow chart illustrating a control method of the multi-level DC/DC conversion circuit shown in FIG. 10 operating in DCM. As shown in FIG. 11, firstly, in the step ST21, the N−1 lower switches are regarded as N−1 main switches, and the N−1 upper switches are regarded as N−1 synchronous rectification switches. Then, in the step ST22, the N−1 main switches are controlled to operate with the switching cycle Ts and to turn on alternately with an interval time $T_\theta$. Finally, in the step ST23, the duty ratio of the N−1 synchronous rectification switches is calculated according to at least the input voltage Vin, the output voltage Vo, the interval time $T_\theta$, the switching cycle Ts and the duty ratio of the N−1 main switches.

In summary, in the present disclosure, the multi-level AC/DC conversion circuit and the multi-level DC/DC conversion circuit calculate the duty ratio of synchronous rectification switch according to the input voltage, the output voltage, the interval time of turning on the main switch, the switching cycle and the duty ratio of main switch, thereby eliminating the need for additional zero-current detecting function or zero-crossing detection circuit in conventional AC/DC conversion circuits. Accordingly, for the multi-level AC/DC conversion circuit and the multi-level DC/DC conversion circuit of the present disclosure, the cost is reduced, and the reliability is enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-level AC/DC conversion circuit, comprising:
   a first input terminal and a second input terminal, configured to receive an input voltage;
   a positive output terminal and a negative output terminal, configured to provide an output voltage to a load;
   a switch bridge arm, connected between the positive output terminal and the negative output terminal, and comprising a first switch and a second switch electrically connected in series to form a connection node connected to the first input terminal;
   an inductor, having a first terminal and a second terminal, wherein the first terminal of the inductor is electrically connected to the second input terminal;
   an N-level conversion circuit, wherein N is a natural number greater than 2, and the N-level conversion circuit comprises:
      N−1 upper switches, wherein a first upper switch to an (N−1)th upper switch among the N−1 upper switches are electrically connected in series between the second terminal of the inductor and the positive output terminal sequentially and form a first upper connection node to an (N−2)th upper connection node sequentially;
      N−1 lower switches, wherein a first lower switch to an (N−1)th lower switch among the N−1 lower switches are electrically connected in series between the second terminal of the inductor and the negative output terminal sequentially and form a first lower connection node to an (N−2)th lower connection node sequentially, the first to (N−1)th lower switches are corresponding to the first to (N−1)th upper switches respectively, the first to (N−2)th upper connection nodes are corresponding to the first to (N−2)th lower connection nodes respectively, and the first to (N−2)th upper connection nodes and the first to (N−2)th lower connection nodes collectively form a first pair of connection nodes to an (N−2)th pair of connection nodes; and
      N−2 flying capacitors, respectively connected to the first pair of connection nodes to the (N−2)th pair of connection nodes sequentially; and
   a control module, wherein when the multi-level AC/DC conversion circuit operates in a discontinuous conduction mode, the control module is configured to:
      regard the N−1 lower switches and the N−1 upper switches as N−1 main switches and N−1 synchronous rectification switches respectively when a potential at the first input terminal is lower than a potential at the second input terminal, and regard the N−1 upper switches and the N−1 lower switches as the N−1 main switches and the N−1 synchronous rectification switches respectively when the potential at the first input terminal is higher than the potential at the second input terminal;

control the N−1 main switches to operate with a switching cycle and to turn on alternately with an interval time; and calculate a duty ratio of the N−1 synchronous rectification switches according to at least the input voltage, the output voltage, the interval time, the switching cycle and a duty ratio of the N−1 main switches.

2. The multi-level AC/DC conversion circuit according to claim 1, wherein $$D_{sr\_DCM} = D_{SW} \frac{\frac{(k+1)T_\theta}{T_S} - D_{CCM}}{D_{CCM} - \frac{kT_\theta}{T_S}}, \frac{D_{SW}T_S}{T_\theta} - 1 \le k < \frac{D_{SW}T_S}{T_\theta},$$

$$D_{CCM} = 1 - \frac{Vin}{Vo},$$

where Vin is the input voltage, Vo is the output voltage, $D_{CCM}$ is a theoretical duty ratio of the main switch of the multi-level AC/DC conversion circuit operating in a continuous conduction mode, $T_\theta$ is the interval time, Ts is the switching cycle, $D_{SW}$ and $D'_{sr\_DCM}$ are respectively the duty ratio of the main switch and a calculation value corresponding to the duty ratio of the synchronous rectification switch when the multi-level AC/DC conversion circuit operates in the discontinuous conduction mode, and k is an integer.

3. The multi-level AC/DC conversion circuit according to claim 2, wherein when the N−1 upper switches and the N−1 lower switches are operated without using bootstrap power supply, the duty ratio of the synchronous rectification switch is equal to a larger one between zero and a value of subtracting a first preset value from the calculation value.

4. The multi-level AC/DC conversion circuit according to claim 3, wherein the first preset value is less than or equal to 0.1.

5. The multi-level AC/DC conversion circuit according to claim 2, wherein when the N−1 upper switches and the N−1 lower switches are operated using bootstrap power supply, the duty ratio of the synchronous rectification switch is equal to a largest one among a value of subtracting a first preset value from the calculation value, a second preset value, and zero.

6. The multi-level AC/DC conversion circuit according to claim 5, wherein the second preset value is less than or equal to 0.01.

7. The multi-level AC/DC conversion circuit according to claim 5, wherein the first preset value is less than or equal to 0.1.

8. The multi-level AC/DC conversion circuit according to claim 1, wherein $$D_{DCM} = \frac{kT_\theta}{T_S} + \left[\frac{2Li_L}{T_S V_o} \frac{D_{CCM} - \frac{kT_\theta}{T_S}}{\frac{(k+1)T_\theta}{T_S} - D_{CCM}}\right]^{\frac{1}{2}},$$

$$\frac{D_{CCM}T_S}{T_\theta} - 1 \le k < \frac{D_{CCM}T_S}{T_\theta},$$

$$D_{CCM} = 1 - \frac{Vin}{Vo},$$

where Vin is the input voltage, Vo is the output voltage, $D_{CCM}$ is a theoretical duty ratio of the main switch of the multi-level AC/DC conversion circuit operating in a continuous conduction mode, $T_\theta$ is the interval time, Ts is the switching cycle, L is an inductance of the inductor, iL is a current flowing through the inductor, $D_{DCM}$ is a theoretical duty ratio of the main switch of the multi-level AC/DC conversion circuit operating in the discontinuous conduction mode, and k is an integer, wherein when $D_{CCM} \le D_{DCM}$, the control module determines that the multi-level AC/DC conversion circuit operates in the continuous conduction mode, wherein when $D_{CCM} > D_{DCM}$, the control module determines that the multi-level AC/DC conversion circuit operates in the discontinuous conduction mode.

9. A control method of a multi-level AC/DC conversion circuit, wherein the multi-level AC/DC conversion circuit comprises:

a first input terminal and a second input terminal, configured to receive an input voltage;

a positive output terminal and a negative output terminal, configured to provide an output voltage to a load;

a switch bridge arm, connected between the positive output terminal and the negative output terminal, and comprising a first switch and a second switch electrically connected in series to form a connection node connected to the first input terminal;

an inductor, having a first terminal and a second terminal, wherein the first terminal of the inductor is electrically connected to the second input terminal; and an N-level conversion circuit, wherein N is a natural number greater than 2, and the N-level conversion circuit comprises:

N−1 upper switches, wherein a first upper switch to an (N−1)th upper switch among the N−1 upper switches are electrically connected in series between the second terminal of the inductor and the positive output terminal sequentially and form a first upper connection node to an (N−2)th upper connection node sequentially;

N−1 lower switches, wherein a first lower switch to an (N−1)th lower switch among the N−1 lower switches are electrically connected in series between the second terminal of the inductor and the negative output terminal sequentially and form a first lower connection node to an (N−2)th lower connection node sequentially, the first to (N−1)th lower switches are corresponding to the first to (N−1)th upper switches respectively, and the first to (N−2)th upper connection nodes are corresponding to the first to (N−2)th lower connection nodes respectively, and the first to (N−2)th upper connection nodes and the first to (N−2)th lower connection nodes collectively form a first pair of connection nodes to an (N−2)th pair of connection nodes; and N−2 flying capacitors, respectively connected to the first pair of connection nodes to the (N−2)th pair of connection nodes sequentially;

wherein when the multi-level AC/DC conversion circuit operates in a discontinuous conduction mode, the control method comprises:

regarding the N−1 lower switches and the N−1 upper switches as N−1 main switches and N−1 synchronous rectification switches respectively when a potential at the first input terminal is lower than a potential at the second input terminal, and regarding the N−1 upper switches and the N−1 lower switches as the N−1 main switches and the N−1 synchronous rectification switches respectively when the potential at the first input terminal is higher than the potential at the second input terminal;

controlling the N−1 main switches to operate with a switching cycle and to turn on alternately with an interval time; and calculating a duty ratio of the N−1 synchronous rectification switches according to at least the input voltage, the output voltage, the interval time, the switching cycle and a duty ratio of the N−1 main switches.

10. The control method according to claim 9, wherein $$D_{sr\_DCM} = D_{SW} \frac{\frac{(k+1)T_\theta}{T_S} - D_{CCM}}{D_{CCM} - \frac{kT_\theta}{T_S}}, \quad \frac{D_{SW}T_S}{T_\theta} - 1 \leq k < \frac{D_{SW}T_S}{T_\theta},$$

$$D_{CCM} = 1 - \frac{Vin}{Vo},$$

where Vin is the input voltage, Vo is the output voltage, $D_{CCM}$ is a theoretical duty ratio of the main switch of the multi-level AC/DC conversion circuit operating in a continuous conduction mode, $T_\theta$ is the interval time, Ts is the switching cycle, $D_{SW}$ and $D'_{sr\_DCM}$ are respectively the duty ratio of the main switch and a calculation value corresponding to the duty ratio of the synchronous rectification switch when the multi-level AC/DC conversion circuit operates in the discontinuous conduction mode, and k is an integer.

11. The control method according to claim 10, wherein when the N−1 upper switches and the N−1 lower switches are operated without using bootstrap power supply, the duty ratio of the synchronous rectification switch is equal to a larger one between zero and a value of subtracting a first preset value from the calculation value.

12. The control method according to claim 11, wherein the first preset value is less than or equal to 0.1.

13. The control method according to claim 10, wherein when the N−1 upper switches and the N−1 lower switches are operated using bootstrap power supply, the duty ratio of the synchronous rectification switch is equal to a largest one among a value of subtracting a first preset value from the calculation value, a second preset value, and zero.

14. The control method according to claim 13, wherein the second preset value is less than or equal to 0.01.

15. The control method according to claim 13, wherein the first preset value is less than or equal to 0.1.

16. The control method according to claim 9, wherein $$D_{DCM} = \frac{kT_\theta}{T_S} + \left[ \frac{2Li_L}{T_S V_o} \frac{D_{CCM} - \frac{kT_\theta}{T_S}}{\frac{(k+1)T_\theta}{T_S} - D_{CCM}} \right]^{\frac{1}{2}},$$

$$\frac{D_{CCM}T_S}{T_\theta} - 1 \leq k < \frac{D_{CCM}T_S}{T_\theta},$$

$$D_{CCM} = 1 - \frac{Vin}{Vo},$$

where Vin is the input voltage, Vo is the output voltage, $D_{CCM}$ is a theoretical duty ratio of the main switch of the multi-level AC/DC conversion circuit operating in a continuous conduction mode, $T_\theta$ is the interval time, Ts is the switching cycle, L is an inductance of the inductor, iL is a current flowing through the inductor, $D_{DCM}$ is a theoretical duty ratio of the main switch of the multi-level AC/DC conversion circuit operating in the discontinuous conduction mode, and k is an integer, wherein when $D_{CCM} \leq D_{DCM}$, the control module determines that the multi-level AC/DC conversion circuit operates in the continuous conduction mode, wherein when $D_{CCM} > D_{DCM}$, the control module determines that the multi-level AC/DC conversion circuit operates in the discontinuous conduction mode.

* * * * *